United States Patent
Xing

(10) Patent No.: US 12,388,388 B2
(45) Date of Patent: Aug. 12, 2025

(54) MOTOR THERMAL OVERLOAD PROTECTION METHOD

(71) Applicant: Schneider Electric Industries SAS, Rueil-Malmaison (FR)

(72) Inventor: Jinlei Xing, Shanghai (CN)

(73) Assignee: Schneider Electric Industries SAS, Rueil-Malmaison (FR)

( * ) Notice: Subject to any disclaimer, the term of this patent is extended or adjusted under 35 U.S.C. 154(b) by 312 days.

(21) Appl. No.: 17/902,090

(22) Filed: Sep. 2, 2022

(65) Prior Publication Data
US 2023/0085119 A1 Mar. 16, 2023

(30) Foreign Application Priority Data
Sep. 9, 2021 (CN) .......................... 202111054779.1

(51) Int. Cl.
*H02K 15/13* (2025.01)
*H02P 21/14* (2016.01)
*H02P 29/032* (2016.01)

(52) U.S. Cl.
CPC .................................. *H02P 29/032* (2016.02)

(58) Field of Classification Search
CPC ...... H02P 23/14; H02P 2101/15; H02P 9/102; H02P 29/60; H02P 1/022; H02P 1/26; H02P 2101/45; H02P 2207/01; H02P 29/024; H02P 29/0241; H02P 29/032; H02P 29/62; H02P 29/64; H02P 29/662; H02P 9/02; H02P 9/04; H02P 21/22; H02P 27/06; H02P 29/027
See application file for complete search history.

(56) References Cited

U.S. PATENT DOCUMENTS

| | | | | |
|---|---|---|---|---|
| 2007/0103822 A1* | 5/2007 | Bilac | ........................ | H02H 6/00 361/32 |
| 2007/0121259 A1* | 5/2007 | Kuivalainen | .......... | H02H 6/005 361/25 |
| 2020/0341062 A1* | 10/2020 | Wang | ...................... | H02P 23/14 |

\* cited by examiner

*Primary Examiner* — Kawing Chan
*Assistant Examiner* — Charles S Laughlin
(74) *Attorney, Agent, or Firm* — Troutman Pepper Locke LLP

(57) ABSTRACT

The present disclosure relates to a method for motor thermal overload protection, including: obtaining a motor thermal limit curve; selecting a first and a second overload factor calculation point on the curve, and calculating the first and second overload factors based on a preset heating time constant; calculating a modified overload factor based on the first and second overload factors; selecting at least two time constant calculation points on the motor thermal limit curve, and calculating a modified heating time constant for each time constant calculation point based on the modified overload factor; obtaining a modified heating time function for each motor operating point based on the modified heating time constant for each time constant calculation point; calculating a stator heat level at each motor operating point based on the modified overload factor and heating time function; comparing the stator heat level with the first and second predetermined thresholds.

6 Claims, 3 Drawing Sheets

MOTOR THERMAL OVERLOAD PROTECTION METHOD

TECHNICAL FIELD

The present disclosure relates to a motor thermal overload protection method.

BACKGROUND

Motor is of vital importance for the continuous operation of the industrial field. On the one hand, the motor should be protected, thus to avoid its overload causing a motor damage. On the other hand, the accidental tripping of the motor should be avoided, because it will interrupt the normal operation and cause huge losses, which may be much higher than that of the damage of the motor. Therefore, it is necessary to protect the motor from overload, and to make the motor thermal overload protection not too sensitive, so that the motor does not trip before the thermal limit.

For the motor overload protection, traditional methods usually set IDMT overcurrent protection according to the motor thermal limit curve. In this case, the actual heat level before the current reaches the overload current is ignored. Therefore, the motor is not strictly protected.

There are also methods of motor overload protection based on the thermal model. However, the current thermal model is not accurate enough, and the motor overload protection characteristics do not match the motor thermal limit curve. In some operating conditions, problem occurs, in which the motor will trip unexpectedly, interrupting the normal operation and causing losses, while in some other operating conditions, problem exists, in which the motor is not effectively protected and the motor is damaged due to overheating.

SUMMARY

In view of the above-mentioned problems and demands, the present disclosure proposes a new motor thermal overload protection method, which solves the above-mentioned problems by adopting the following technical features and has improved performance of motor thermal overload protection.

On the one hand, the present disclosure provides a motor thermal overload protection method, which includes: acquiring a motor thermal limit curve, the motor thermal limit curve representing the relationship between the current in the stator coil of the motor and the maximum allowable safe time; selecting a first overload factor calculation point and a second overload factor calculation point on the motor thermal limit curve, and calculating a first overload factor of the first overload factor calculation point and a second overload factor of the second overload factor calculation point based on a preset heating time constant; calculating a modified overload factor based on the first overload factor and the second overload factor; selecting at least two time constant calculation points on the motor thermal limit curve, and calculating a modified heating time constant for each time constant calculation point based on the modified overload factor; obtaining a modified heating time function for each motor operating point based on the modified heating time constant for each time constant calculation point; calculating a stator heat level at each motor operating point based on the modified overload factors and the modified heating time function; comparing the stator heat level with a first predetermined threshold and a second predetermined threshold greater than the first predetermined threshold, and giving an alarm if the stator heat level is greater than the first predetermined threshold and less than the second predetermined threshold; stopping the motor if the stator heat level is greater than the second predetermined threshold.

According to a preferred scheme, wherein calculating the first overload factor of the first overload factor calculation point and the second overload factor of the second overload factor calculation point based on the preset heating time constant comprises calculating the first overload factor and the second overload factor based on the following formula:

$$k_i = \sqrt{\left(\frac{I_{eq}}{I_B}\right)^2 - \frac{\left(\frac{I_{eq}}{I_B}\right)^2 - 1}{e^{\frac{T_i}{\tau'_{heat}}}}}$$

wherein $k_i$ is the overload factor at a overload factor calculation point numbered i, wherein i is 1 or 2; $T_i$ is the maximum allowable safe time at the overload factor calculation point numbered i; $I_{eq}$ is the equivalent current of the motor; $I_B$ is the full-load current of the motor; $\tau'_{heat}$ is the preset heating time constant.

According to a preferred scheme, calculating the modified overload factor based on the first overload factor and the second overload factor includes calculating the modified overload factor based on the average value of the first overload factor and the second overload factor, the lower limit value of the overload factor and the upper limit value of the overload factor.

According to a preferred scheme, the modified overload factor is calculated based on the following formula:

$$\begin{cases} k = k^*, & \frac{k_1 + k_2}{2} \leq k^* \\ k = \frac{k_1 + k_2}{2}, & k^* < \frac{k_1 + k_2}{2} \leq k^{} \\ k = k^{}, & \frac{k_1 + k_2}{2} > k^{**} \end{cases}$$

wherein k is the modified overload factor; $k_1$ and $k_2$ are the first overload factor at the first overload factor calculation point and the second overload factor at the second overload factor calculation point, respectively; k is the lower limit value of the overload factor; k is the upper limit of the overload factor.

According to a preferred scheme, selecting at least two time constant calculation points on the motor thermal limit curve includes selecting four time constant calculation points on the motor thermal limit curve.

According to a preferred scheme, the at least two time constant calculation points include the first overload factor calculation point and the second overload factor calculation point.

According to a preferred scheme, the modified heating time constant at each time constant calculation point is calculated based on the following formula:

$$\tau(I_{eq}) = T(I_{eq})/\ln\frac{\left(\frac{I_{eq}}{I_B}\right)^2 - 1}{\left(\frac{I_{eq}}{I_B}\right)^2 - k^2}$$

wherein, $\tau(I_{eq})$ is the modified heating time constant at the time constant calculation point where the equivalent current of the motor is $I_{eq}$, and $T(I_{eq})$ is the maximum allowable safe time at the time constant calculation point where the equivalent current of the motor is $I_{eq}$.

According to a preferred scheme, obtaining the modified heating time function based on the modified heating time constant of each time constant calculation point comprises: taking the modified heating time constant at the time constant calculation point with the minimum equivalent current among the time constant calculation points as the lower limit value of the heating time constant, and for a motor operating point with equivalent current less than the minimum equivalent current, making its heating time constant equal to the lower limit value of the heating time constant; taking the modified heating time constant at the time constant calculation point with the maximum equivalent current among the time constant calculation points as the upper limit value of the heating time constant, and for a motor operating point with equivalent current greater than the maximum equivalent current, making its heating time constant equal to the upper limit value of the heating time constant; for a motor operating point whose equivalent current is greater than the minimum equivalent current and less than the maximum equivalent current, using the interpolation algorithm to obtain its heating time constant.

According a preferred scheme, based on the modified overload factor and the modified heating time function, the stator heat level is calculated with the following formula:

$$H_{stator}(t) = \left(\frac{I_{eq}}{k \cdot I_B}\right)^2 \cdot \frac{\Delta t}{\tau + \Delta t} + H_{stator}(t - \Delta t) \cdot \frac{\tau}{\tau + \Delta t}$$

wherein $H_{stator}(t)$ and $H_{stator}(t-\Delta t)$ are the stator heat levels at time t and ($t-\Delta t$), respectively.

Hereinafter, a more detailed description of the best embodiment for implementing the present disclosure will be given with reference to the accompanying drawings, so that the features and advantages of the present disclosure can be easily understood.

BRIEF DESCRIPTION OF THE DRAWINGS

In order to more clearly explain the technical scheme of the embodiments of the present disclosure, the drawings of the embodiments of the present disclosure will be briefly introduced below, wherein the drawings are only used to show some embodiments of the present disclosure, but not to limit all embodiments of the present disclosure to them.

DETAILED DESCRIPTION OF THE EMBODIMENTS

Figure 1:
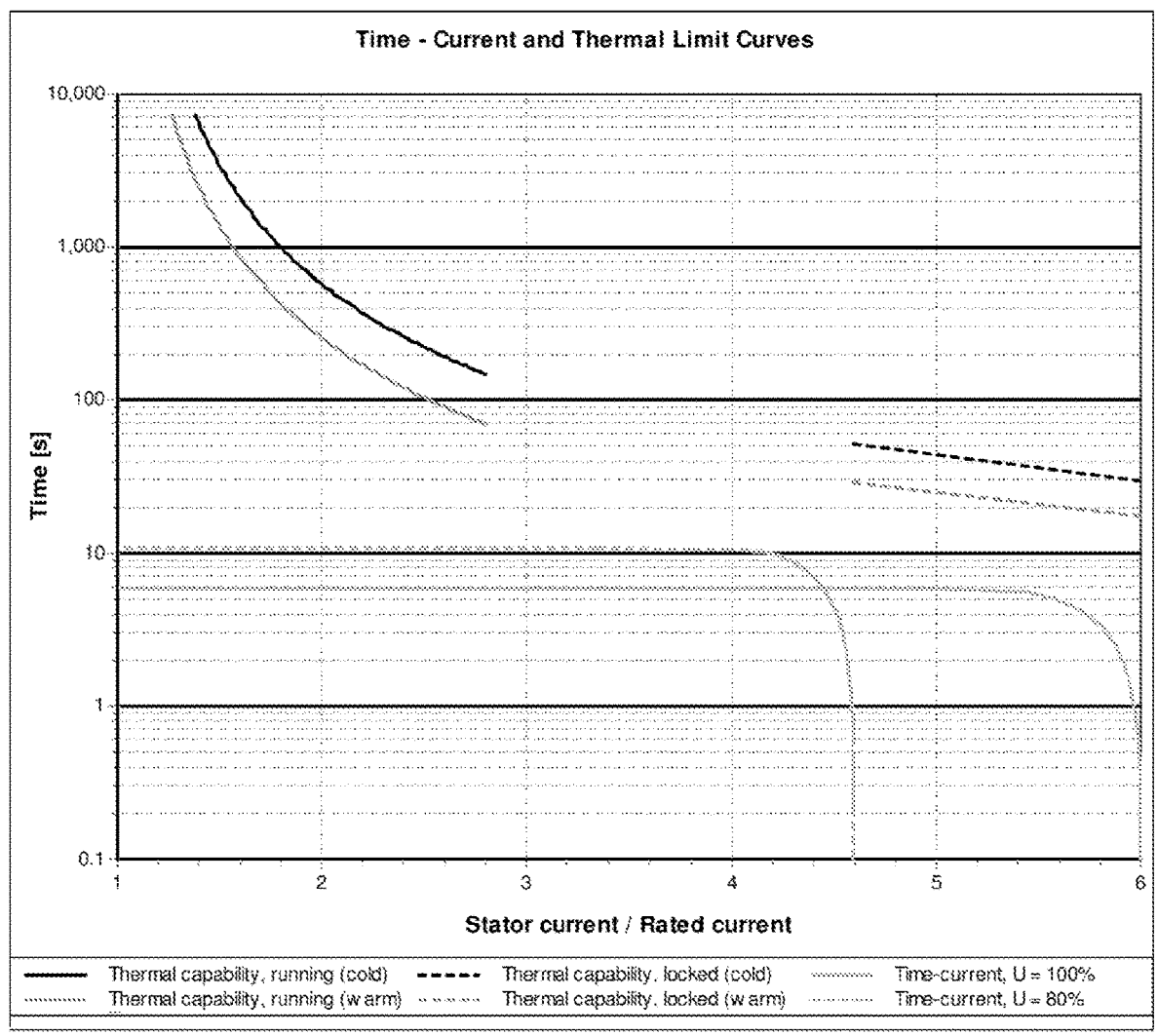
FIG. 1 is an exemplary motor thermal limit curve.

In order to make the purpose, technical scheme and advantages of the technical scheme of the present disclosure clearer, the technical scheme of the present disclosure will be clearly and completely described below in conjunction with specific embodiments of the present disclosure. In the drawings, the same reference numerals represent the same parts. It should be noted that the described embodiments are part of the embodiments of this disclosure, but not all of them. Based on the described embodiments of this disclosure, all other embodiments obtained by those of ordinary skill in the art without creative work are within the scope of protection of this disclosure.

Compared with the embodiments shown in the drawings or described in the text, the feasible embodiments within the scope of protection of the present disclosure may have fewer steps, different steps, steps in different orders, etc. In addition, two or more steps described below can be implemented in a single step, or a single step shown or described can be implemented as a plurality of separate steps.

Unless otherwise defined, the technical terms or scientific terms used here shall have their ordinary meanings as understood by those with ordinary skills in the field to which the present disclosure belongs. The words "first", "second" and the like used in the specification and claims of the patent application of the present disclosure do not indicate any order, quantity or importance, but are only used to distinguish different components. Similarly, "a" or "one" and the like don't necessarily mean quantity limitation. Words "comprise" or "include" and the like mean that the elements or objects appearing before the word encompass the listed elements or objects appearing after the word and their equivalents, without excluding other elements or objects.

The present disclosure relates to a motor thermal overload protection method, which needs to utilize the motor thermal limit curve, the motor thermal limit curve can represent the relationship between the current in the stator coil of the motor and the maximum allowable safe time under the conditions of overload in operation, rotor locking and starting, etc. FIG. 1 is an exemplary motor thermal limit curve, the abscissa of which is the non-dimensionalized equivalent current, and the ordinate is the maximum allowable safe time. The specific embodiments mentioned below are mainly based on the thermal limit curve of the type of FIG. 1. However, the motor thermal limit curve used in this disclosure can be different from that shown in FIG. 1, and any thermal limit curve that can represent the relationship between the current in the stator coil of the motor and the maximum allowable safe time can be used in the present method.

The method of the present disclosure first includes obtaining a motor thermal limit curve, which represents the relationship between the current in the stator coil of the motor and the maximum allowable safe time.

The method of the present disclosure further includes selecting a first overload factor calculation point and a second overload factor calculation point on the motor thermal limit curve. As an example only, the following two points can be selected as the first and second overload factor calculation points. Wherein the equivalent current of the first overload factor calculation point $I_{eq}$ is $1.4I_B$, and the maximum allowable safe time $T_1$ is 2500 s, the equivalent current of the second overload factor calculation point $I_{eq}$ is $1.6I_B$, and the maximum allowable safe time $T_2$ is 1000 S.

TABLE 1

| T1 - Maximum Allowable Operation Time at 1.4IB | 2500 s |
|---|---|
| T2 - Maximum Allowable Operation Time at 1.6IB | 1000 s |

After selecting the first overload factor calculation point and the second overload factor calculation point, the method includes calculating a first overload factor of the first overload factor calculation point and a second overload factor of the second overload factor calculation point based on the preset heating time constant, wherein the preset heating time constant can be preset according to the model and parameters of the motor (for example, the type of cooling system of the motor) etc. In this example, the preset heating time constant $\tau'_{heat}$ is selected as 30 minutes.

According to a preferred embodiment, the points on the thermal limit curve are set to satisfy the following formula:

$$T(I_{eq}) = \tau_{heat} \cdot \ln \frac{\left(\frac{I_{eq}}{k \cdot I_B}\right)^2 - \left(\frac{I_B}{k \cdot I_B}\right)^2}{\left(\frac{I_{eq}}{k \cdot I_B}\right)^2 - 1}$$

wherein $I_{eq}$ is the equivalent current of the motor, $I_{eq}$ is the full-load current of the motor, $T(I_{eq})$ is the maximum allowable safe time at the point where the equivalent current is $I_{eq}$, k is the overload factor and $\tau_{heat}$ is the heating time constant.

Therefore, the overload factor $k(I_{eq})$ at the point where the equivalent current is $I_{eq}$ can be calculated by the following formula:

$$k(I_{eq}) = \sqrt{\left(\frac{I_{eq}}{I_B}\right)^2 - \frac{\left(\frac{I_{eq}}{I_B}\right)^2 - 1}{e^n}}$$

In the above formula, $$n = \frac{T(I_{eq})}{\tau_{heat}}.$$

Therefore, the aforementioned calculation of the first overload factor of the first overload factor calculation point and the second overload factor of the second overload factor calculation point based on the preset heating time constant can be embodied as calculating the first overload factor and the second overload factor based on the following formula:

$$k_i = \sqrt{\left(\frac{I_{eq}}{I_B}\right)^2 - \frac{\left(\frac{I_{eq}}{I_B}\right)^2 - 1}{e^{T_i/\tau'_{heat}}}}$$

wherein $k_i$ is the overload factor at the overload factor calculation point numbered i, where i is 1 or 2. Therefore, $k_1$ represents the first overload factor of the first overload factor calculation point, and $k_2$ represents the second overload factor of the second overload factor calculation point. $\tau'_{heat}$ is the preset heating time constant.

Taking the two overload factor calculation points in Table 1 as an example, their overload factors can each be calculated as follows.

$$k_1 = \sqrt{(1.4)^2 - \frac{(1.4)^2 - 1}{e^n}} \ \& \ k_2 = \sqrt{(1.6)^2 - \frac{(1.6)^2 - 1}{e^n}}$$

After obtaining the first overload factor and the second overload factor, the method further includes calculating a modified overload factor based on the first overload factor and the second overload factor.

According to a preferred embodiment, calculating the modified overload factor based on the first overload factor and the second overload factor includes calculating the modified overload factor based on the average value of the first overload factor and the second overload factor, the lower limit value of the overload factor and the upper limit value of the overload factor.

According to a more specific and preferred embodiment, the modified overload factor is calculated based on the following formula:

$$\begin{cases} k = k^*, & \frac{k_1 + k_2}{2} \leq k^* \\ k = \frac{k_1 + k_2}{2}, & k^* < \frac{k_1 + k_2}{2} \leq k^{} \\ k = k^{}, & \frac{k_1 + k_2}{2} > k^{**} \end{cases}$$

wherein k is the modified overload factor, $k_1$ and $k_2$ are the first overload factor at the first overload factor calculation point and the second overload factor at the second overload factor calculation point, respectively, k' is the lower limit value of the overload factor, for example, the lower limit value may be selected as 1.1, and k" is the upper limit value of the overload factor is selected, for example, the lower limit value may be selected as 1.25.

Taking the two overload factor calculation points in Table 1 as examples, and selecting the preset heating time constant $\tau'_{heat}$ of 30 minutes, $k_1=1.31$ and $k_2=1.27$ can be calculated. Substituting into the above formula, when the upper limit value of the overload factor k" is set to 1.25, the modified overload factor k is 1.25.

After obtaining the modified overload factor k, the method further includes selecting at least two time constant calculation points on the motor thermal limit curve for calculating the modified heating time constant of each time constant calculation point.

According to a preferred scheme, selecting at least two time constant calculation points on the motor thermal limit curve includes selecting four time constant calculation points on the motor thermal limit curve. However, the present disclosure does not exclude selecting other number of time constant calculation points, such as 3, 5, etc.

Preferably, the selected at least two time constant calculation points may include both the first overload factor calculation point and the second overload factor calculation point, so as to simplify the point picking step and simplify the calculation. However, the present disclosure does not exclude the case in which the at least two time constant calculation points only include one of the first and second overload factor calculation points, or do not include any of the first and second overload factor calculation points.

As an example only, the following four points can be selected as the time constant calculation points.

TABLE 2

| | |
|---|---|
| T1 - Maximum Allowable Operation Time at 1.4IB | 2500 s |
| T2 - Maximum Allowable Operation Time at 1.6IB | 1000 s |
| T3 - Maximum Allowable Operation Time at 1.8IB | 500 s |
| T4 - Maximum Allowable Operation Time at 2.0IB | 250 s |

After the time constant calculation points are selected, the method includes calculating the modified heating time constant of each time constant calculation point based on the modified overload factor k.

According to a preferred embodiment, the modified heating time constant at each time constant calculation point is calculated based on the following formula:

$$\tau(I_{eq}) = T(I_{eq})/\ln\frac{\left(\frac{I_{eq}}{I_B}\right)^2 - 1}{\left(\frac{I_{eq}}{I_B}\right)^2 - k^2}$$

wherein $\tau(I_{eq})$ is the modified heating time constant at the time constant calculation point where the equivalent current of the motor is $I_{eq}$.

After obtaining the modified heating time constant at each time constant calculation point, the method includes obtaining the modified heating time function at each motor operating point based on the modified heating time constant at each time constant calculation point. Preferably, this step specifically includes: taking the modified heating time constant at the point with the minimum equivalent current among the time constant calculation points as the lower limit value of the heating time constant, and for a motor operating point with equivalent current less than the minimum equivalent current, making its heating time constant equal to the lower limit value of the heating time constant. The modified heating time constant at the point with the maximum equivalent current among the time constant calculation points is taken as the upper limit value of the heating time constant, and for a motor operating point with equivalent current greater than the maximum equivalent current, making its heating time constant equal to the upper limit value of the heating time constant. For the motor operating point whose equivalent current is greater than the minimum equivalent current and less than the maximum equivalent current, the interpolation algorithm is used to obtain its heating time constant.

For example, for the case where four time constant calculation points in Table 2 are selected, the modified heating time function can be obtained as follows.

$$\begin{cases} \tau_{heat}(I_{eq}) = \tau_{heat}(1.4), \\ \tau_{heat}(I_{eq}) = \tau_{heat}(1.4) + (I_{eq} - 1.4) \cdot \frac{\tau_{heat}(1.6) - \tau_{heat}(1.4)}{0.2}, & 1.4 < I_{eq} \leq 1.6 \\ \tau_{heat}(I_{eq}) = \tau_{heat}(1.6) + (I_{eq} - 1.6) \cdot \frac{\tau_{heat}(1.8) - \tau_{heat}(1.6)}{0.2}, & 1.6 < I_{eq} \leq 1.8 \\ \tau_{heat}(I_{eq}) = \tau_{heat}(1.8) + (I_{eq} - 1.8) \cdot \frac{\tau_{heat}(2.0) - \tau_{heat}(1.8)}{0.2}, & 1.8 < I_{eq} \leq 2.0 \\ \tau_{heat}(I_{eq}) = \tau_{heat}(2.2) + (I_{eq} - 2.0) \cdot \frac{\tau_{heat}(2.2) - \tau_{heat}(2.0)}{0.2}, & 2.0 < I_{eq} \leq 2.2 \\ \tau_{heat}(I_{eq}) = \tau_{heat}(2.2), \end{cases}$$

Through the above steps, the modified overload factor and the modified heating time function can be obtained. Furthermore, the method further includes calculating the stator heat level at each motor operating point based on the modified overload factor and the modified heating time function.

According to a preferred embodiment, the stator heat level is calculated by the following formula:

$$H_{stator}(t) = \left(\frac{I_{eq}}{k \cdot I_B}\right)^2 \cdot \frac{\Delta t}{\tau + \Delta t} + H_{stator}(t - \Delta t) \cdot \frac{\tau}{\tau + \Delta t}$$

wherein $H_{stator}(t)$ and $H_{stator}(t-\Delta t)$ are the stator heat levels at time t and (t−Δt), respectively.

In addition, the method may further include comparing the stator heat level with a first predetermined threshold and a second predetermined threshold greater than the first predetermined threshold, and giving an alarm if the stator heat level is greater than the first predetermined threshold and less than the second predetermined threshold; and stopping the motor if the stator heat level is greater than a second predetermined threshold.

It can be seen that the method described of the present disclosure calculates the modified overload factor k and the modified heating time constant τ according to the motor thermal limit curve in the motor data table and using the selected points in the thermal limit curve, and obtains the modified heating time function covering any motor operating point. Then, the modified overload coefficient and the modified heating time function are applied in the stator thermal model, and the motor overload protection characteristics finally obtained are well matched with the motor thermal limit curve.

Figure 2:
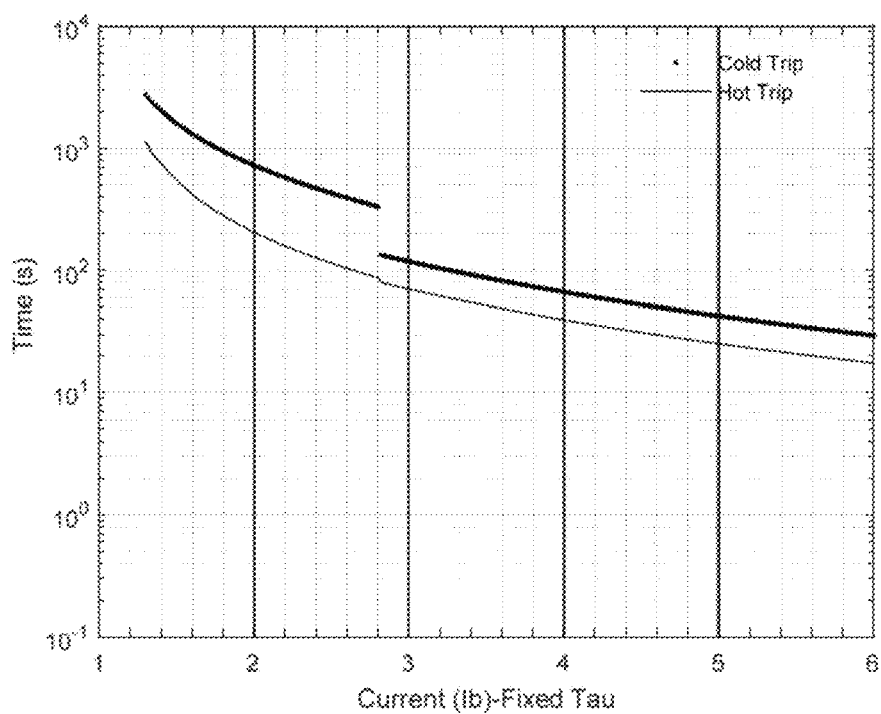
FIG. 2 shows the operation characteristics of the thermal overload protection obtained only with a fixed heating time constant.
Figure 3:
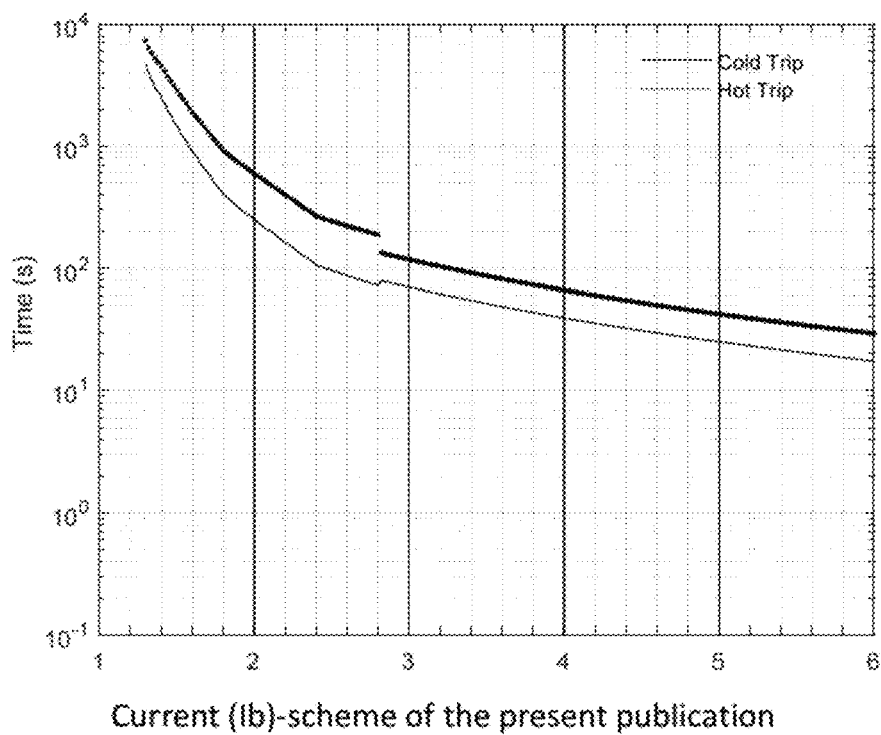
FIG. 3 is the operation characteristics of the thermal overload protection obtained with the method described in the present disclosure.

FIG. 3 shows the operation characteristics of thermal overload protection obtained by the method described in the present disclosure. In contrast, FIG. 2 shows the operation characteristics of thermal overload protection obtained by using only a fixed heating time constant instead of the method described in the present disclosure. It can be seen that the overload protection characteristics of the motor obtained by the present method are closer to the motor thermal limit curve shown in FIG. 1.

Figure 4:
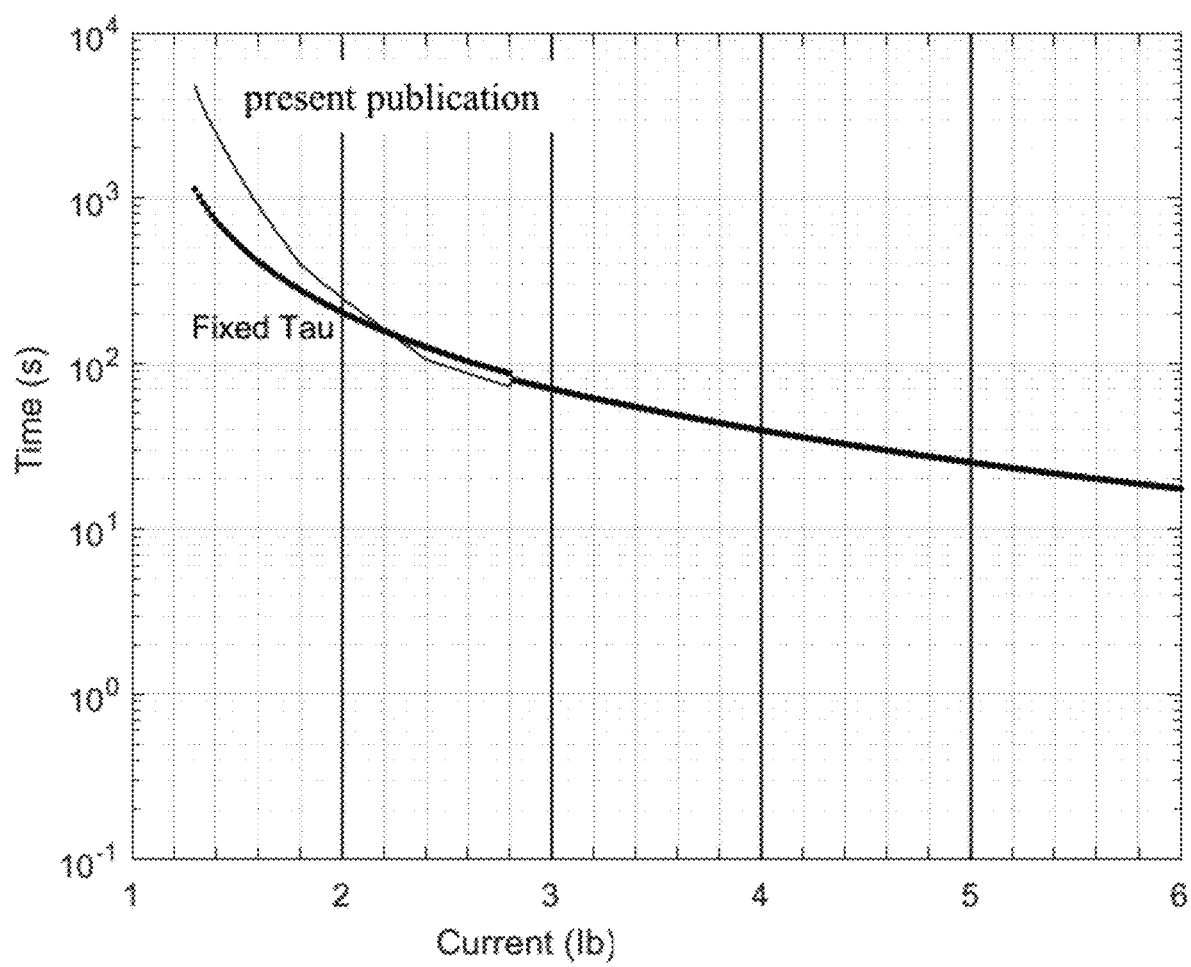
FIG. 4 is a comparison diagram of the thermal overload protection operation characteristics obtained with a fixed heating time constant shown in FIG. 2 and the thermal overload protection operation characteristics obtained with the method disclosed in the present disclosure shown in FIG. 3.

FIG. 4 is a comparison diagram of the thermal overload protection operation characteristics obtained by a fixed heating time constant shown in FIG. 2 and the thermal overload protection operation characteristics obtained by the method described in the present disclosure shown in FIG. 3. It can also be seen from the comparison diagram that the motor overload protection characteristic obtained by present method is obviously different from the protection action characteristic curve obtained by a fixed heating time constant. In this example, compared with the protection scheme of the present method, the protection obtained by fixing the heating time constant obviously has the following problems: when the overload current is less than 2.2 times of the rated current of the motor, the running time with a fixed heating time constant is shorter than the thermal limit curve, which means that the motor is overprotected and unnecessary tripping may occur. When the overload current is more than 2.2 times of the rated current of the motor, the running time with a fixed heating time constant is longer than the thermal limit curve, which means that the motor is not well protected and may be damaged by overheating.

The exemplary implementation of the scheme proposed in the present disclosure has been described in detail above with reference to the preferred embodiments. However, it can be understood by those skilled in the art that without departing from the concept of the present disclosure, various variations and modifications can be made to the above specific embodiments, and various technical features and structures proposed in the present disclosure can be combined in various ways without exceeding the scope of protection of the present disclosure, which is determined by the appended claims.

What is claimed is:

1. A method for motor thermal overload protection, comprising:
   acquiring a motor thermal limit curve, the motor thermal limit curve representing the relationship between the current in the stator coil of the motor and the maximum allowable safe time;
   selecting a first overload factor calculation point and a second overload factor calculation point on the motor thermal limit curve, and calculating a first overload factor of the first overload factor calculation point and a second overload factor of the second overload factor calculation point based on a preset heating time constant;
   calculating a modified overload factor based on the first overload factor and the second overload factor;
   selecting at least two time constant calculation points on the motor thermal limit curve, and calculating a modified heating time constant for each time constant calculation point based on the modified overload factor;
   obtaining a modified heating time function for each motor operating point based on the modified heating time constant for each time constant calculation point;
   calculating a stator heat level at each motor operating point based on the modified overload factor and the modified heating time function;
   comparing the stator heat level with a first predetermined threshold and a second predetermined threshold greater than the first predetermined threshold, and giving an alarm if the stator heat level is greater than the first predetermined threshold and less than the second predetermined threshold; stopping the motor if the stator heat level is greater than the second predetermined threshold;
   wherein calculating the first overload factor of the first overload factor calculation point and the second overload factor of the second overload factor calculation point based on the preset heating time constant comprises calculating the first overload factor and the second overload factor based on the following formula:

$$k_i \sqrt{\left(\frac{I_{eq}}{I_B}\right)^2 - \frac{\left(\frac{I_{eq}}{I_B}\right)^2 - 1}{e^{T_i/\tau'_{heat}}}}$$

wherein,
$k_i$ is the overload factor at the overload factor calculation point numbered i, wherein i is 1 or 2;
$T_i$ is the maximum allowable safe time at the overload factor calculation point numbered i;
$I_{eq}$ is the equivalent current of the motor;
$I_B$ is the full-load current of the motor;
$\tau'_{heat}$ is the preset heating time constant;

wherein calculating the modified overload factor based on the first overload factor and the second overload factor comprises calculating the modified overload factor based on the average value of the first overload factor and the second overload factor, the lower limit value of the overload factor and the upper limit value of the overload factor; and wherein the modified overload factor is calculated based on the following formula:

$$\begin{cases} k = k^*, & \frac{k_1 + k_2}{2} \leq k^* \\ k = \frac{k_1 + k_2}{2}, & k^* < \frac{k_1 + k_2}{2} \leq k^{} \\ k = k^{}, & \frac{k_1 + k_2}{2} > k^{**} \end{cases}$$

wherein k is the modified overload factor;
$k_1$ and $k_2$ are the first overload factor at the first overload factor calculation point and the second overload factor at the second overload factor calculation point, respectively;
k' is the lower limit value of the overload factor;
k" is the upper limit value of the overload factor.

2. The method of claim 1, wherein selecting at least two time constant calculation points on the motor thermal limit curve comprises selecting four time constant calculation points on the motor thermal limit curve.

3. The method of claim 1, wherein the at least two time constant calculation points include the first overload factor calculation point and the second overload factor calculation point.

4. The method of claim 1, wherein the modified heating time constant at each time constant calculation point is calculated based on the following formula:

$$\tau(I_{eq}) = T(I_{eq})/\ln \frac{\left(\frac{I_{eq}}{I_B}\right)^2 - 1}{\left(\frac{I_{eq}}{I_B}\right)^2 - k^2}$$

wherein, $\tau(I_{eq})$ is the modified heating time constant at the time constant calculation point where the equivalent current of the motor is $I_{eq}$;
$T(I_{eq})$ is the maximum allowable safe time at the time constant calculation point where the equivalent current of the motor is $I_{eq}$.

5. The method of claim 4, wherein obtaining the modified heating time function based on the modified heating time constant of each time constant calculation point comprises:
   taking the modified heating time constant at the time constant calculation point with the minimum equivalent current among the time constant calculation points as the lower limit value of the heating time constant, and for motor operating point with equivalent current less than the minimum equivalent current, making its heating time constant equal to the lower limit value of the heating time constant;
   taking the modified heating time constant at the time constant calculation point with the maximum equivalent current among the time constant calculation points as the upper limit value of the heating time constant, and for motor operating point with equivalent current greater than the maximum equivalent current, making its heating time constant equal to the upper limit value of the heating time constant;
   for motor operating point whose equivalent current is greater than the minimum equivalent current and less than the maximum equivalent current, using the interpolation algorithm to obtain its heating time constant.

6. The method of claim 5, wherein the stator heat level is calculated based on the modified overload factor and the modified heating time function, and using the following formula:

$$H_{stator}(t) = \left(\frac{I_{eq}}{k \cdot I_B}\right)^2 \cdot \frac{\Delta t}{\tau + \Delta t} + H_{stator}(t - \Delta t) \cdot \frac{\tau}{\tau + \Delta t}$$

wherein $H_{stator}(t)$ and $H_{stator}(t-\Delta t)$ are the stator heat levels at time t and (t–Δt), respectively.

* * * * *